United States Patent [19]
Huber et al.

[11] Patent Number: 5,782,076
[45] Date of Patent: Jul. 21, 1998

[54] CLOSED LOOP AIR COOLING SYSTEM FOR COMBUSTION TURBINES

[75] Inventors: David John Huber, North Canton, Ohio; Michael Scot Briesch, Orlando, Fla.

[73] Assignee: Westinghouse Electric Corporation, Pittsburgh, Pa.

[21] Appl. No.: 649,506

[22] Filed: May 17, 1996

[51] Int. Cl.[6] .................. F02G 3/00; F02C 5/00
[52] U.S. Cl. .................. 60/39.02; 60/39.75; 60/736; 60/760; 415/115
[58] Field of Search .................. 60/39.02, 752, 60/760, 39.75, 736; 415/115, 116, 176; 416/96 R, 97 R

[56] References Cited

U.S. PATENT DOCUMENTS

| | | | |
|---|---|---|---|
| 2,782,000 | 2/1957 | Ledinegg | 253/39.15 |
| 3,314,650 | 4/1967 | McCormick | 253/39.15 |
| 3,515,499 | 6/1970 | Beer et al. | 416/95 |
| 3,738,771 | 6/1973 | Delarbre et al. | 416/96 |
| 3,751,909 | 8/1973 | Kohler | 60/39.75 |
| 4,190,398 | 2/1980 | Corsmeier et al. | 415/114 |
| 4,302,153 | 11/1981 | Tubbs | 416/96 R |
| 4,815,272 | 3/1989 | Laurello | 60/39.75 |
| 5,201,634 | 4/1993 | Hough | 416/96 R |
| 5,394,687 | 3/1995 | Chen et al. | 60/39.75 |
| 5,555,721 | 9/1996 | Bourneuf et al. | 60/39.75 |
| 5,581,996 | 12/1996 | Koch et al. | 60/39.02 |
| 5,611,197 | 3/1997 | Bunker | 60/39.75 |

*Primary Examiner*—Charles G. Freay

[57] ABSTRACT

Convective cooling of turbine hot parts using a closed loop system is disclosed. Preferably, the present invention is applied to cooling the hot parts of combustion turbine power plants, and the cooling provided permits an increase in the inlet temperature and the concomitant benefits of increased efficiency and output. In preferred embodiments, methods and apparatus are disclosed wherein air is removed from the combustion turbine compressor and delivered to passages internal to one or more of a combustor and turbine hot parts. The air cools the combustor and turbine hot parts via convection and heat is transferred through the surfaces of the combustor and turbine hot parts.

20 Claims, 1 Drawing Sheet

5,782,076

CLOSED LOOP AIR COOLING SYSTEM FOR COMBUSTION TURBINES

REFERENCE TO GOVERNMENT CONTRACTS

Development for this invention was supported in part by a U.S. Department of Energy contract. Accordingly, the United States government may have certain rights in the invention, including a paid-up license in this invention and the right in limited circumstances to require the patent owner to license others on reasonable terms as may be provided for by the terms of contract DE-AC21-93MC30247 awarded by the Department of Energy.

FIELD OF THE INVENTION

The present invention relates to turbomachinery, and more specifically, to the design of the cooling systems for combustion turbines.

BACKGROUND OF THE INVENTION

The performance of a turbine can be enhanced by increasing the inlet temperature. However, as a result of the increased temperature, the turbine blades also operate at elevated temperatures, and these temperatures are often so high that they approach the material failure temperature for the turbine components. Schemes must therefore be devised to cool these "hot part" components, and in particular the turbine blades, in order to ensure efficient and useful life cycles for these components. Typical "hot parts" include the combustor basket, transitions, turbine vanes and turbine rotor and shaft components. It will be understood, however, that the cooling technique described herein is applicable to any component of a turbine that is at an elevated temperature.

Prior art combustion turbines utilize cooling techniques that rely upon a film of cooler gases to prevent components such as the combustor from reaching critically high temperatures. A coolant, usually air, flows through passages within the components, and then is ejected through orifices in the surface of the component. A cool layer of gases is created on the surface, thereby protecting the components from the heat generated in the main combustor or by gases within the main portion of the turbine.

The techniques of cooling have grown more sophisticated as the inlet temperatures have increased and the state of the art has advanced. For example, U.S. Pat. 3,515,499—Beer et al discloses turbine blades that are created by being built up from individual "wafers" thereby permitting the formation of internal fluid flow passageways and slots, thereby permitting airflow to more effectively cool the turbine blade.

It is also well known to bleed coolant air from the compressor portion of a gas turbine and route this relatively cooler air to the hollow interior of the turbine blades. The heat transferred to this coolant is typically exhausted, thus creating an open loop system. The bled air effects not only the thermal balance of the equipment, but also impacts the performance by changing the characteristics of the flows within the turbine, altering the types of flow, film thicknesses and other important operating parameters.

This technique allows combustor inlet temperature, and thus turbine operating temperatures, to be increased beyond the allowable operating limits of the components, thereby increasing efficiency and output. It has been found, however, that the process of injecting the fluid into the main gas hot path is itself a detriment to combustion turbine output and efficiency in several ways. First, the ejection of coolant through the surface of the hot parts disrupts the flowfields around them and causes mixing losses, both of which result in pressure losses through the system and decrease turbine expansion efficiency. Second, the main combustor hot gas path is cooled as the coolant is mixed into it, thereby decreasing turbine output and combustion turbine efficiency.

It is also known to take advantage of the mechanical forces created by the rotation of the blade to effect heat transfer. If a liquid of appropriate specific gravity occupies a partially-filled cavity within a turbine blade, rotation of the blade will tend to force the fluid to the extreme tip of the cavity. However, this is the area of greatest heat, thus the liquid will vaporize and be displaced by any remaining liquid. The displaced gas will, by reason of the constant volume of the cavity, settle at the root section of the cavity, where it will give up heat and condense to a liquid, beginning the process all over again.

This technique is explained, for example, in U.S. Pat. No. 5,201,634—Hough discloses a turbine blade that has a core and internal passages filled with sodium. Centrifugal force and the temperature gradient between the core and the tips of the blades create a pressure gradient that causes the sodium to be vaporized and condensed. The heat required to effect vaporization is taken from the hot portion of the blade, and the heat given up upon condensation is absorbed at the internal core and transferred to cooler regions of the device. Similarly, U.S. Pat. No. 4,190,398—Corsmeier et al. discloses individually cooling the blades of a turbine by the internal circulation of a fluid coolant. Heat from the fluid inside the turbine blades is transferred to engine lubrication oil, which is in turn cooled by transferring heat from the oil to the turbine fuel, thus at least a portion of the heat from the turbine blades is added back to the power cycle. U.S. Pat. No. 3,738,771—Delarbe et al. discloses hollow helical passageways that extend from the root to the tip of a turbine blade. The passageways are closed and partially filled with a fluid such as liquid sodium or potassium that is chosen so that the portion near the tip will be vaporized at the temperature encountered at the tip, while the area of the cavity near the root will remain liquified under most conditions. Finally, U.S. Pat. No. 2,782,000—Ledinegg discloses a system wherein blades having fluid-filled internal cavities are arrayed as a subset around individualized heat exchanger such that one turbine row is essentially a self-contained unit that can be removed and maintained without interfering with the heat exchange capabilities of the rest of the turbine assembly.

It is also known that the air cooling and internal closed loop liquid cooling techniques described above can be combined in one turbine blade as shown in U.S. Pat. No. 4,302,153—Tubbs in which a turbine blade that is cooled by permitting cooling air to enter through an entry aperture and exit through orifices on the leading edge of the airfoil. Another cooling path is provided by that is filled with liquid sodium. The liquid path is from the interior of the root of the blade through internal passageways that begin at the trailing edge of the blade and end near the leading edge. The hot leading edge gives up heat to the liquid, vaporizing it. The hot vapor is routed through a return passage back to the cooler core, where it is condensed.

However, all of the cooling systems to date suffer from one or more major drawbacks. In particular, as explained above, the existing air flow cooling systems disturb the flow fields within the turbine, while the closed loop liquid systems are complicated, expensive and less effective and reliable. Therefore, it would be desirable to provide an air flow-based cooling system that did not unduly disturb the flow of gas through a turbine structure, but still enables heat from the hot parts to be extracted. Additionally, it would be further desirable to transfer heat from critical components to another part of the turbine where heat is being added, rather than ejecting the heat from the hot parts as waste heat. If the heat reduces the amount of fuel required by the system, the overall efficiency of such an improved system would be raised. It is therefore an object of the present invention to provide an air flow cooling system for a turbine in which heat is transferred from the turbine hot parts to another section of the turbine.

SUMMARY OF THE INVENTION

It has now been found, however, that the deficiencies of the prior art can be overcome by methods and apparatus for cooling combustion turbine power plants in which air is removed from the combustion turbine compressor and delivered to air passages internal to one or more of a combustor and turbine hot parts. The air cools the combustor and turbine hot parts via convection and heat is transferred through the surfaces of the combustor and turbine hot parts. In certain embodiments, the step of removing air comprises removing air from the compressor discharge or the combustor shell. If the turbine hot parts are moving parts, a small leakage of cooling air is preferably permitted to enter a gas path within the combustion turbine for positive ventilation of the air passages. In the case of rotating blades and the rotor shaft, coolant is pumped through the rotor shaft and which passes the coolant through the rotating turbine blades. In certain preferred embodiments, efficiency is further enhanced by returning heated air leaving the combustor and turbine hot parts to the combustor shell, or alternatively, by returning heated air leaving the combustor and turbine hot parts to the combustor. Coolant may also be returned to the rotor shaft 64 extracting the coolant prior to being injected into the combustor shell or the combustor itself. In other preferred embodiments, the coolant is discharged into the combustor shell through slots or holes in a first stage turbine disk assembly. In certain embodiments, air is removed from the compressor discharge or compressor shell and cooled with incoming combustion turbine fuel and/or water taken from the cooling system or bottoming cycle. The air may optionally be compressed slightly in an auxiliary cooling air compressor to provide enough excess air pressure to drive it through the cooling system prior to its introduction into the combustor shell or the combustor itself. The compression should be of an additional amount required to drive it through the closed loop turbine cooling system and may occur prior to its being extracted from the compressor discharge or the combustor shell. In certain embodiments, at least a portion of air exiting the auxiliary cooling air compressor is reheated by allowing heat exchange with at least some of the cooling air extracted from the compressor exit or combustor shell.

DETAILED DESCRIPTION OF THE PREFERRED EMBODIMENTS

Figure 1:
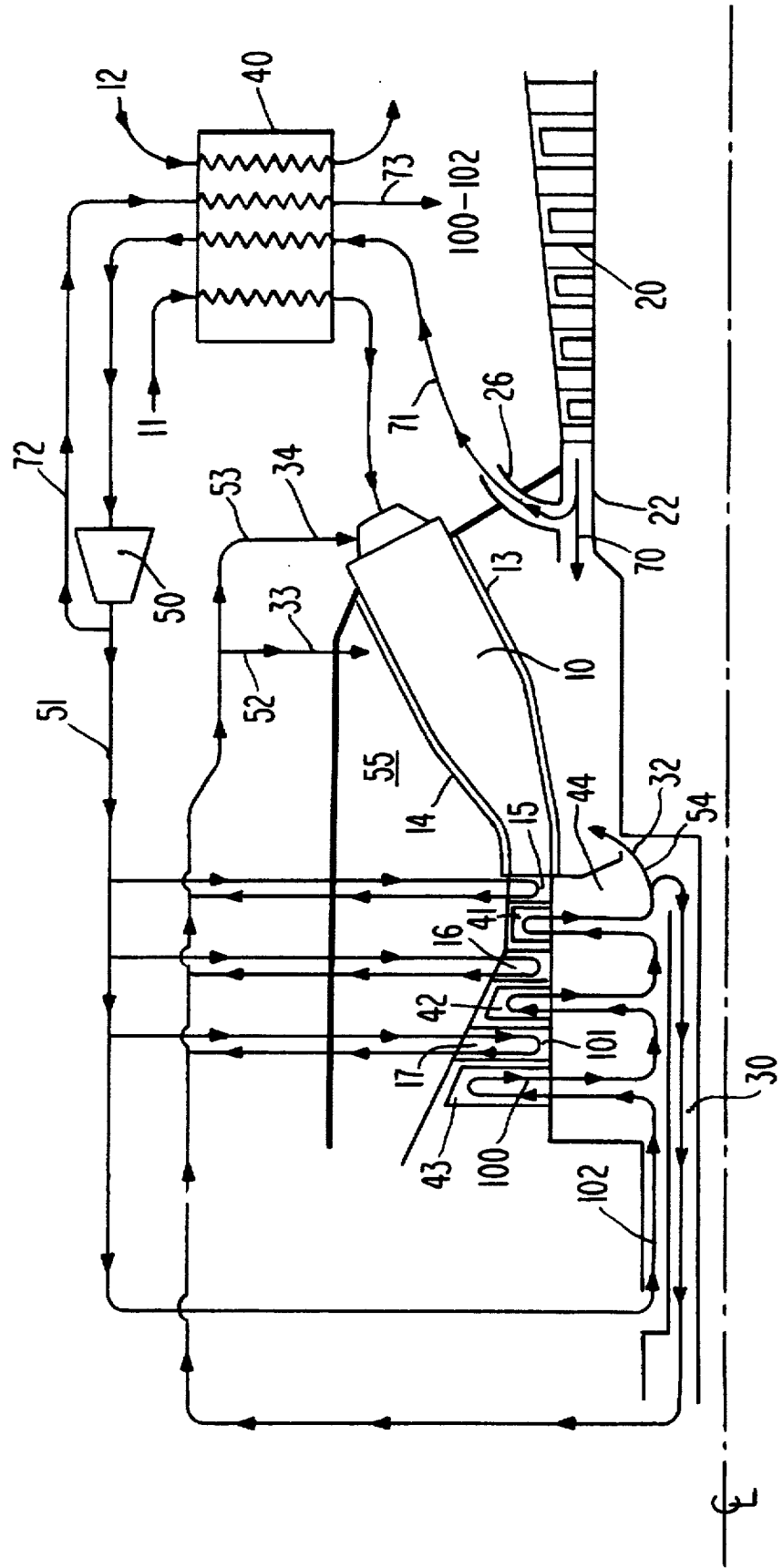
FIG. 1 is a partially schematic, partially diagrammatic view of a portion of a turbine and associated components that incorporates the present invention.

Referring now to FIG. 1, the general layout and operation of several embodiments of the present invention are illustrated. As set forth below, the illustration of FIG. 1 incorporates several alternative constructions and options, all of which are useful in various embodiments of the present invention. It is to be understood that certain of these features may be deleted or may be used in various subcombinations to achieve the benefits of the present invention. Those of skill in the art will be familiar with the construction and operation of the equipment used in combustion turbine power plants. In order to more clearly illustrate the present invention, miscellaneous equipment is illustrated schematically or not shown, while important components of the turbine are shown diagrammatically in a cross-section broken away at the turbine centerline.

As seen in FIG. 1, a typical system includes a combustion turbine combustor 10 that receives a flow of air or other gases 70 from the discharge 22 of a combustion turbine compressor 20. The combustor 10, and other hot parts including the combustor basket 13, transitions 14, and turbine vanes 15–17 turbine rotor 30 and rotating blades 41–43, have internal passageways 100 that admit an airflow 51 from the turbine compressor 20, and this relatively cooler air flow cools the components via convection through the hot part surfaces. For moving parts, or parts where a completely closed passage is not practical, a small leakage of cooling air is permitted to enter the gas path for positive ventilation of cooled cavities. As the combustor 10 or turbine hot parts are cooled by the air, the air is itself heated, and this heated air 52 is returned to the combustor shell 55 at an inlet point 33 or, in some embodiments, heated air 53 is returned to the combustor 10 itself at another inlet point 34. Thus, the present invention provides a cooling system in which the heat absorbed by the coolant while passing through the hot parts is returned to the combustion turbine. In other words, at least a portion of the heat from the turbine blades is added back to the power cycle.

Although FIG. 1 specifically illustrates cooling the combustor 10, it is known in the prior art to provide rotating turbine blades and a rotor shaft with closed loop passageways. However, as explained above, in the prior art, these passageways were always filled with a liquid and the energy lost and gained through vaporization and condensation effected the heat transfer. In the present invention, a coolant comprised of air or another gas is instead pumped through internal passageways 102 in the rotor shaft 30 and passed through internal passageways 100 in the rotating turbine blades 41–43. The relatively cooler air absorbs heat turbine rotor 30 and rotating blades 41–43 and it is either then returned to the rotor shaft 30 from which the heated air 52 is injected into the combustor shell 55 at inlet paint 33 or, in some embodiments, to the combustor itself, or the heated air is merely discharged into the combustor shell through slots or holes 26 in the first stage turbine disk assembly.

Thus, regardless of the portion of the turbine that is cooled using air in a closed loop system in accordance with the present invention, the loss mechanisms described above are substantially eliminated since the present invention eliminates the need to eject coolant from the combustor and/or turbine hot parts. As a result there are significant increases in both thermal efficiency and output for combustion turbine simple cycles, as well as combined cycle power plants.

Referring again to FIG. 1, it can be seen that in some embodiments, air is removed from the compressor discharge 26 or compressor shell and cooled with incoming combustion turbine fuel 60 and/or water taken from the cooling system or bottoming cycle. The air is them compressed slightly in an auxiliary cooling air compressor 50 to provide enough excess air pressure to drive it through the closed loop cooling system 40 and then send the air through the closed loop cooling system 40 prior to its introduction into the combustor shell or the combustor itself. Alternatively, the air may be compressed the additional amount required to drive it through the closed loop turbine cooling system prior to its being extracted from the compressor discharge or the combustor shell. In another embodiment, the some or all of the cooling air exiting the auxillary cooling air compressor 50 is reheated by allowing heat exchange with some or all of the cooling air extracted from the compressor exit or combustor shell. In yet another embodiment the cooling air 71 is not cooled after it is extracted from the compressor exit or combustor shell.

The present invention greatly increases combustion turbine thermal efficiency and output, thereby allowing for corresponding increases in thermal efficiency and output, for both simple and combined cycle power plants that utilize combustion turbines. Furthermore, since almost all of the air compressed in the compressor is delivered to the combustor, either directly or through the closed loop cooling system, the present invention also provides reduced power plant emissions since the greater degree of premixing available, due to the presence of the turbine cooling air, allows for lower flame temperatures, and therefore lower emissions of $NO_x$.

Although certain embodiments of the present invention have been set forth herein and described with particularity, these descriptions are meant to illustrate the nature of the present invention and are not limitative. Upon review of the foregoing specification, various modifications, adaptations and improvements to the methods and apparatus disclosed will immediately present themselves to those of skill in the art. Such specification, various modifications, adaptations and improvements will not depart from the spirit of the present invention and thus, in order to apprehend the full scope of the present invention, reference should be made to the appended claims.

We claim:

1. In a combustion turbine system having a first compressor, a combustor for producing a flow of hot gas, and a turbine for expanding said flow of hot gas, said turbine having a rotor coupled to said compressor and having a plurality of rotating blades, said rotating turbine blades having internal cooling air passages formed therein, a method of cooling said rotating turbine blades, comprising the steps of:

a) compressing air in said first compressor so as to produce a flow of compressed air;

b) extracting a first portion of said flow of compressed air so as to produce a flow of cooling air;

c) further compressing said flow of cooling air in a second compressor so as to produce a flow of further compressed cooling air;

d) directing said further compressed cooling air to flow through said internal cooling air passages in said rotating turbine blades so as to transfer heat from said rotating turbine blades to said further compressed cooling air, thereby cooling said rotating turbine blades and producing a flow of heated cooling air; and e) injecting said flow of heated cooling air from said rotating turbine blades into said combustor, and directing a second portion of said flow of compressed air produced by said first compressor to said combustor, and combusting therein a flow of fuel in said flow of heated cooling air and said second portion of said flow of compressed air.

2. The method according to claim 1, further comprising the step of cooling said flow of cooling air prior to said further compression thereof.

3. The method according to claim 2, wherein the step of cooling said flow of cooling air prior to said further compression thereof comprises transferring heat from said flow of cooling air to said flow of fuel prior to said combustion thereof.

4. The method according to claim 2, wherein the step of cooling said flow of cooling air prior to said further compression thereof comprises transferring heat from said flow of cooling air to a flow of water.

5. The method according to claim 2, further comprising the step of reheating at least a portion of said further compressed cooling air prior to directing said further compressed cooling air to said rotating turbine blades.

6. The method according to claim 5, wherein the step of reheating at least a portion of said further compressed cooling air comprises transferring heat thereto from said second portion of said flow of compressed air from said first compressor.

7. The method according to claim 1, wherein said first compressor has a compressor exit through which said compressed air is discharged, and wherein the step of extracting said first portion of said compressed air comprises extracting air discharged from said first compressor exit.

8. In a combustion turbine system having a compressor, a combustor, and a turbine through which a hot gas flows, said turbine having plurality of components exposed to said flow of hot gas, said turbine components having internal cooling air passages formed therein, a method of cooling said turbine components, comprising the steps of:

a) compressing air in said compressor so as to produce a flow of compressed air;

b) dividing said flow of compressed air into first and second portions;

c) cooling said first portion of said flow of compressed air so as to produce a flow of cooled cooling air;

d) further compressing said flow of cooled cooling air so as to produce a flow of further compressed cooling air;

e) directing said further compressed cooling air to flow through said internal cooling air passages in said turbine components so as to transfer heat from said turbine components to said further compressed cooling air, thereby cooling said turbine components and producing a flow of heated cooling air; and f) directing both said flow of heated cooling air from said turbine components and said second portion of said compressed air from said compressor to said combustor, and combusting a flow of fuel therein.

9. The method according to claim 8, further comprising the step of reheating at least a portion of said further compressed cooling air prior to directing said further compressed air to said turbine components.

10. The method according to claim 9, wherein the step of reheating said at least a portion of said further compressed cooling air comprises transferring heat thereto from said second portion of said compressed air from said compressor.

11. The method according to claim 8, wherein the step of cooling said first portion of said flow of compressed air comprises transferring heat therefrom to said flow of fuel prior to said combustion thereof.

12. The method according to claim 8, wherein the step of cooling said first portion of said compressed air comprises transferring heat therefrom to a flow of water.

13. The method according to claim 8, wherein said combustor is in flow communication with a shell within which said combustor is disposed, and wherein the step of directing said flow of heated cooling air from said turbine components to said combustor comprises directing said heated cooling air from said turbine components to said shell.

14. The method according to claim 13, wherein said turbine rotor has a first stage rotating disk having an opening formed therein in flow communication with said shell, and wherein the step of directing said flow of heated cooling air from said turbine components to said combustor comprises directing said heated cooling air from said turbine components into said first stage rotating turbine disk and through said opening formed therein.

15. The method according to claim 8, wherein said combustor is in flow communication with a shell within which said combustor is disposed, and wherein the step of directing said flow of heated cooling air from said turbine components to said combustor is accomplished without directing said heated cooling air into said shell.

16. A combustion turbine system comprising:
 a) a first compressor for producing a flow of discharged compressed air;
 b) a combustor for burning a fuel therein;
 c) a turbine, said turbine having a rotor having a plurality of rotating blades, said rotating turbine blades having internal cooling air passages formed therein;
 d) means for extracting air from said first compressor so as to produce a flow of cooling air;
 e) a second compressor for compressing said flow of cooling air extracted from said first compressor so as to produce a flow of further compressed cooling air;
 f) means for directing said further compressed cooling air to flow through said internal cooling air passages in said rotating turbine blades so as to transfer heat from said rotating turbine blades to said further compressed cooling air, thereby cooling said turbine blades and producing a flow of heated further compressed cooling air; and
 g) means for injecting said flow of heated further compressed cooling air from said rotating turbine blades into said combustor.

17. The combustion turbine system according to claim 16, further comprising means for cooling said flow of cooling air prior to said further compression thereof.

18. The combustion turbine system according to claim 17, wherein said means for cooling said flow of cooling air prior to said further compression thereof comprises means for transferring heat from said flow of cooling air to said flow of fuel prior to said combustion thereof.

19. The combustion turbine system according to claim 17, further comprising means for reheating at least a portion of said further compressed cooling air prior to directing said further compressed air to said rotating turbine blades.

20. The combustion turbine system according to claim 19, wherein said means for reheating at least a portion of said further compressed cooling air comprises means for transferring heat thereto from at least a portion of said flow of discharged compressed air.

* * * * *

UNITED STATES PATENT AND TRADEMARK OFFICE
CERTIFICATE OF CORRECTION

PATENT NO. : 5,782,076
DATED : July 21, 1998
INVENTOR(S) : David John Huber et al.

It is certified that error appears in the above-identified patent and that said Letters Patent is hereby corrected as shown below:

On the title page, item [56], add the following references.

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 3 | 6 | 0 | 0 | 8 | 9 | 0 | 08/19/71 | White, et al. | | | |
| | | 4 | 6 | 9 | 6 | 1 | 5 | 6 | 09/19/87 | Burr, et al. | | | |
| | | 5 | 2 | 7 | 9 | 1 | 1 | 1 | 01/19/94 | Bell, et al. | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | WO | 97/ | 0 | 3 | 2 | 8 | 1 | 01/19/97 | PCT | | | | |
| | | 0 | 58 | 4 | 9 | 5 | 8 | A1 | 07/19/93 | EPO | | | | |
| | | 2 | 1 | 0 | 3 | 5 | 6 | 0 | 4/19/72 | France | | | | |
| | | | | | | | | | | | | | | |

Signed and Sealed this

Sixteenth Day of March, 1999

Attest:

Attesting Officer

Q. TODD DICKINSON

Acting Commissioner of Patents and Trademarks